United States Patent
Rajewski

[11] Patent Number: 5,871,162
[45] Date of Patent: Feb. 16, 1999

[54] PAPER SHREDDING ASSEMBLY

[75] Inventor: Robert C. Rajewski, R.R. #1, Donalda, Alberta, Canada, T0B 1H0

[73] Assignee: Robert C. Rajewski, Donalda, Canada

[21] Appl. No.: 2,510

[22] Filed: Jan. 2, 1998

[51] Int. Cl.[6] .................................................. B02C 21/02
[52] U.S. Cl. .................................. 241/100; 241/101.741; 241/101.761; 241/186.5
[58] Field of Search .......................... 241/100, 101.761, 241/101.741, 186.4, 186.5

[56] References Cited

U.S. PATENT DOCUMENTS

| | | | |
|---|---|---|---|
| 3,189,286 | 6/1965 | O'Connor | 241/186.5 |
| 3,370,796 | 2/1968 | Herr | 241/186.5 |
| 3,556,418 | 1/1971 | Hokana | 241/186.5 |
| 5,207,391 | 5/1993 | Anderson | 241/186.5 |
| 5,542,617 | 8/1996 | Rajewski | 241/101.763 |

*Primary Examiner*—Mark Rosenbaum
*Attorney, Agent, or Firm*—Holme Roberts & Owen

[57] ABSTRACT

A truck-mounted paper shredder is provided. The shredder uses a reciprocating plunger to feed a rotary hammer mill, which shreds the paper. An auger is used to transfer the shredded paper into a discrete storage container. The container includes a suction device to pull dust through the assembly into a filter in the container. The container is separate so that it can be removed when loaded and left standing for later pick up, allowing the truck and shredder to take on an empty container and move on to the next job.

7 Claims, 4 Drawing Sheets

PAPER SHREDDING ASSEMBLY

FIELD OF THE INVENTION

This invention relates to a paper shredding assembly adapted for use on a truck or like vehicle, said assembly including a discrete storage container which, when loaded with shredded paper, may be separately removed and left standing for pick up by another truck.

BACKGROUND OF THE INVENTION

Truck-mounted paper shredding assemblies ("shredders") are commonly in use today. These units move about from one office to another to shred often confidential paper documents.

Most of the prior art shredders of this type use knives or cam type cutting devices to shred the paper into strips. In general, these shredders rely on manual feeding of paper to ensure that the paper enters the machine at an even thickness and rate. As a consequence, they are relatively slow in processing paper.

U.S. Pat. No. 5,542,617, issued to D. E. Rajewski, discloses a different and faster type of shredder—it utilizes a rotary hammer mill to shred the paper. More particularly this shredder comprises:

A circular feed tub, into which the paper to be shredded is dumped. The tub floor forms a slot or opening;

The hammer mill is positioned beneath the opening. The rotating hammers of the mill protrude through the opening, when the mill is operating, and pull in paper—this paper is shredded as the hammers pass through close-fitting gaps formed between spaced apart steel fingers;

A rotating sweep arm is positioned in the tub. The arm is spaced above the tub floor, to avoid contact with the hammers. It functions to bias paper in the tub to the hammer mill opening;

The mill includes a trough-like curved screen cupping its bottom half. The paper is further shredded as the hammers force it through the screen;

The shredded paper drops into an open-top trough positioned beneath the mill. The trough changes into a tubular chute at its far end, which chute extends into a closed box forming a storage chamber. A plunger reciprocates lengthwise in the trough to push the paper through the chute into the storage chamber and, in doing so, to compress paper already in the chamber;

The box forming the storage chamber has a movable side wall which can be advanced by a cylinder to empty the box by driving its contents through an opposed, hinged box side wall into a waiting receptacle such as the box of a second truck.

There are a number of problems associated with the '617 shredder. More particularly:

The sweep arm rotating over the protruding hammer ends is spaced above the tub floor. As a result, paper is left on the floor after completion of the shredding operation. This is undesirable when shredding confidential documents;

The paper is fed at an angle into the hammers by the rotating sweep arm. This leads to deflection and bending of the hammers, which has proved to be a significant maintenance problem;

Fine particles ("dust") generated by the shredding process create various problems. For example, the reciprocating plunger, biasing shredded paper through the bottom trough and chute, creates a back flow of air from the storage area on each stroke. This back flow carries dust with it back into the loading and shredding zones. As a result the machine must be cleaned frequently and maintenance costs are affected. In addition, heat produced by the moving parts can ignite the dust and has caused fires.

Furthermore, the dust can leak from the machine, which makes it unpleasant to work with; and finally The storage box is a permanent part of the unit, requiring the continuing presence of a second truck for receiving the load of shredded paper once the storage box is loaded.

The present invention is directed toward improving the '617 shredder design, to solve these problems.

SUMMARY OF THE INVENTION

In one broad aspect the invention involves providing a shredder having a feed compartment, hammer mill and shredded paper transfer/compression means contained in one housing and providing a separate, discrete storage container forming a storage chamber. The storage container has an inlet so that the transfer/compression means, preferably an auger, can extend into the storage chamber to deliver shredded paper thereinto and compress it. The shredder and container can be operatively connected or disconnected. When the storage chamber has been loaded, the container can be removed from the truck and left standing for later pick up by a second truck at a convenient time.

In a preferred aspect, the housing of the shredder forms a generally rectangular feed compartment having top, bottom and side walls and first and second ends. The hammer mill opening is formed in the bottom wall adjacent its second end. A reciprocating plunger, extending transversely of the compartment, is positioned at its first end and is arranged so that the plunger moves along the surface of the bottom wall. The plunger biases paper, fed in through an opening in the top wall of the compartment, directly at the hammers. In this way the floor of the compartment is swept clean and the paper is not forced into the hammers at an angle.

In another preferred aspect, an auger assembly is provided to transfer the shredded paper from the shredder into the storage chamber. The auger assembly is positioned beneath the hammer mill and comprises an auger working within a transfer tube. The auger and transfer tube protrude from the shredder housing so that they can extend into the auger inlet of the storage container, to enable transfer of shredded paper into the storage chamber. The auger feeds the shredded paper with minimal back flow of dust-laden air back into the shredder. The auger extends beyond the end of the transfer tube in the storage chamber and has thick flights at that point, for powerfully compressing the shredded paper in the chamber. Preferably the auger is driven by a planetary gear assembly so that the feed rate remains substantially constant even though there is increasing resistance to auger throughput as the storage chamber fills.

In another preferred aspect, a suction fan and filter assembly is provided in association with the storage chamber, to draw air through the shredder into the container and to recover dust by filtration prior to exhausting the cleaned air. In this way, dust accumulation around the hammer mill and auger is reduced. Dust leakage from the machine is also reduced. An air hammer is associated with the filter to knock accumulated dust out of the filter into the storage chamber at the end of shredding.

Broadly stated, the invention is a paper-shredding assembly for use on a truck, comprising a shredder having an upper feed compartment and a lower chamber containing a rotary hammer mill and a discharge auger assembly; a storage container forming a storage chamber and positionable adjacent the shredder, said container forming an auger inlet, communicating with the storage chamber, for enabling the auger assembly to extend into the chamber when the container is operatively connected with the shredder, the container being a discrete unit so that it may independently be removed from the truck; the feed compartment preferably being rectangular and having top, bottom and side walls and first and second ends, the top wall forming a feed opening through which paper may be fed for shredding, the bottom wall forming a hammer mill opening adjacent its second end; the hammer mill being supported by the shredder in position beneath the hammer mill opening, said mill having hammers which protrude into the feed compartment when rotating; means, preferably a reciprocating plunger, positioned within the feed compartment and extending transversely thereof, for biasing paper along the bottom wall from adjacent its first end toward the hammer mill opening to feeding the paper directly into the rotating hammers; an auger assembly, positioned beneath the hammer mill and supported by the shredder, said auger assembly projecting through the auger inlet into the storage chamber of the container; and means for actuating the hammer mill, auger assembly and biasing means; whereby the biasing means will sweep the bottom of the feed compartment substantially clean, the auger assembly will transfer shredded paper from the shredder into the storage chamber and compress it, and the loaded container can be removed from the truck as a discrete unit.

DESCRIPTION OF THE PREFERRED EMBODIMENT

Figure 1:
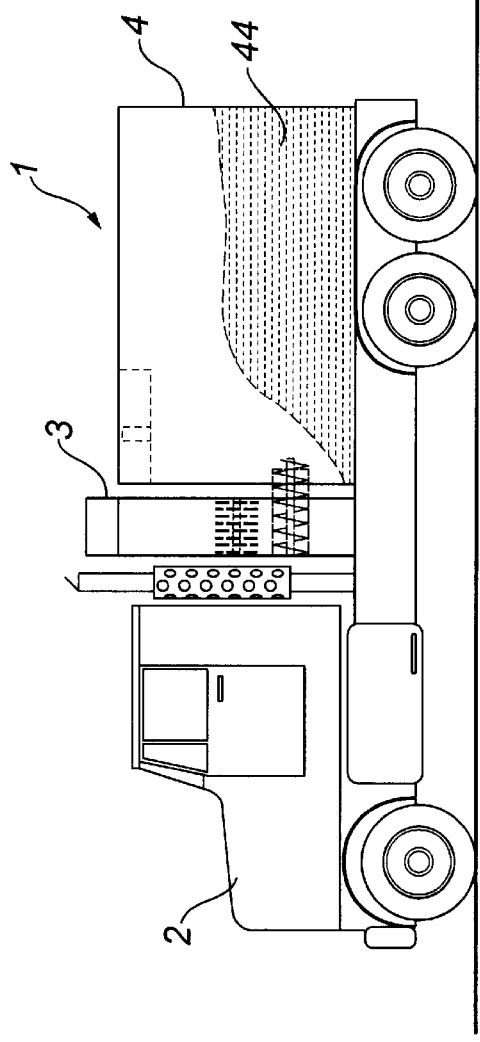
FIG. 1 is a side elevation showing the shredder mounted on a truck, the shredder being shown in section.
Figure 2:
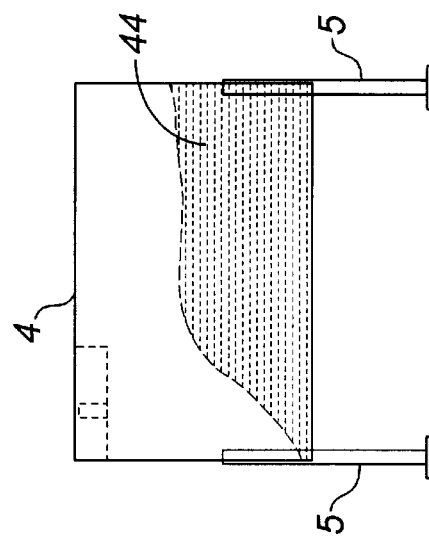
FIG. 2 is a side elevation, partly in section, showing the first housing of the shredder on the truck and the storage container left standing on the ground awaiting pick up and removal.
Figure 2:
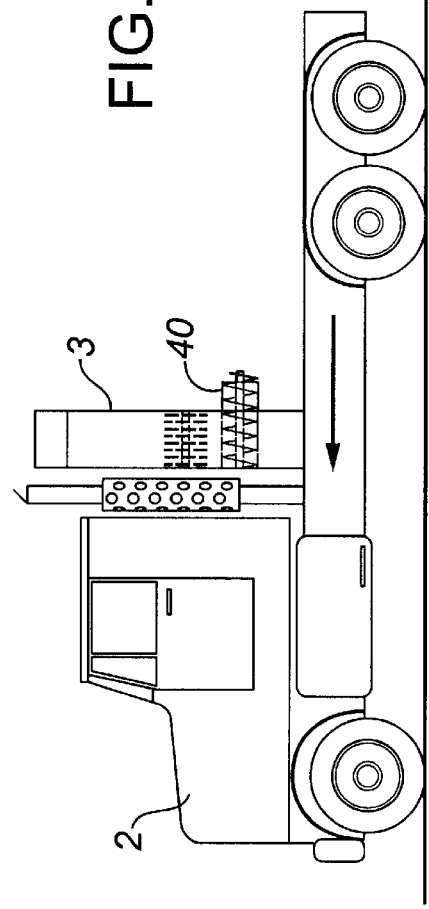
Figure 3:
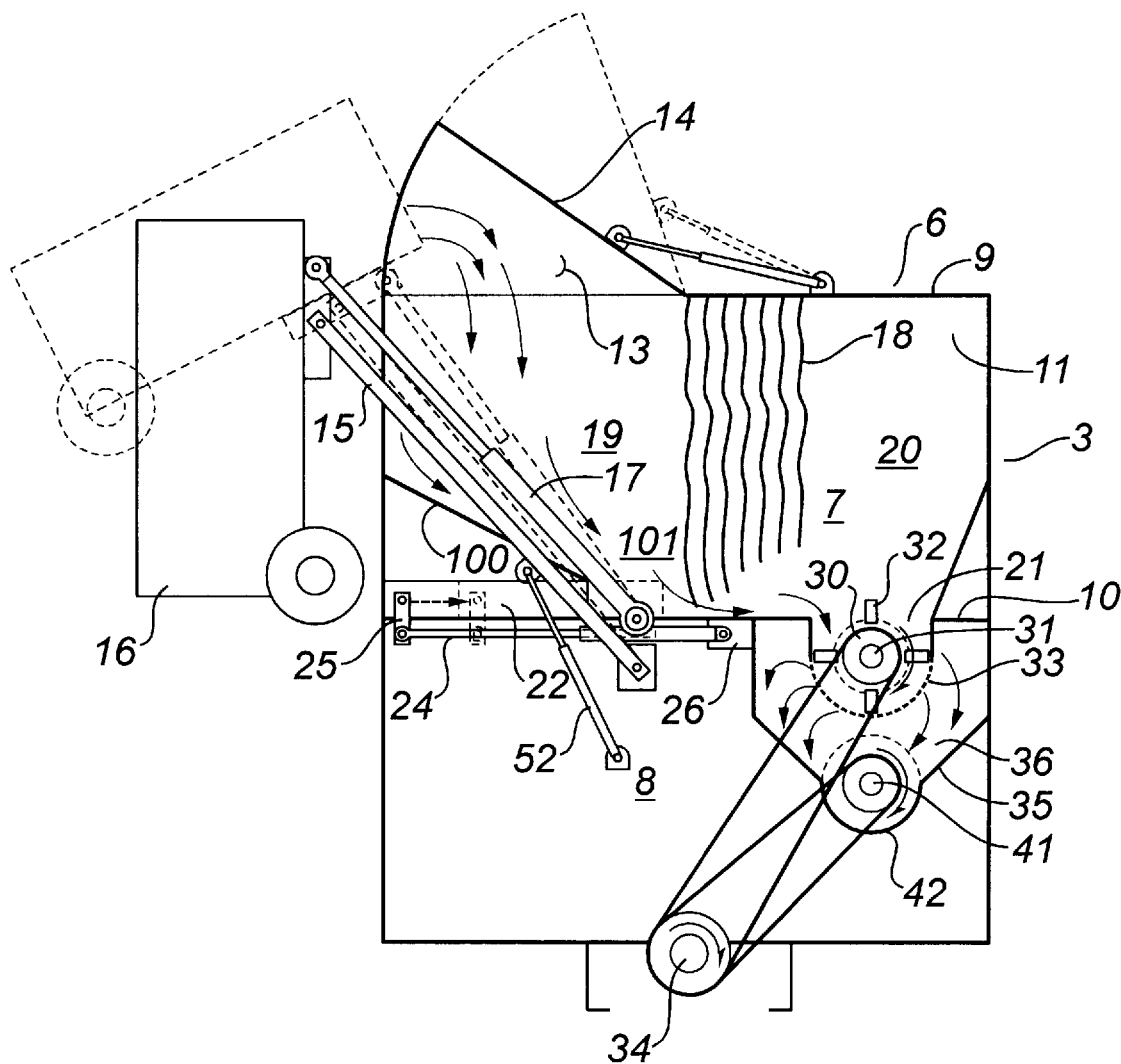
FIG. 3 is a front end elevation of the shredder, showing internals in broken lines.
Figure 4:
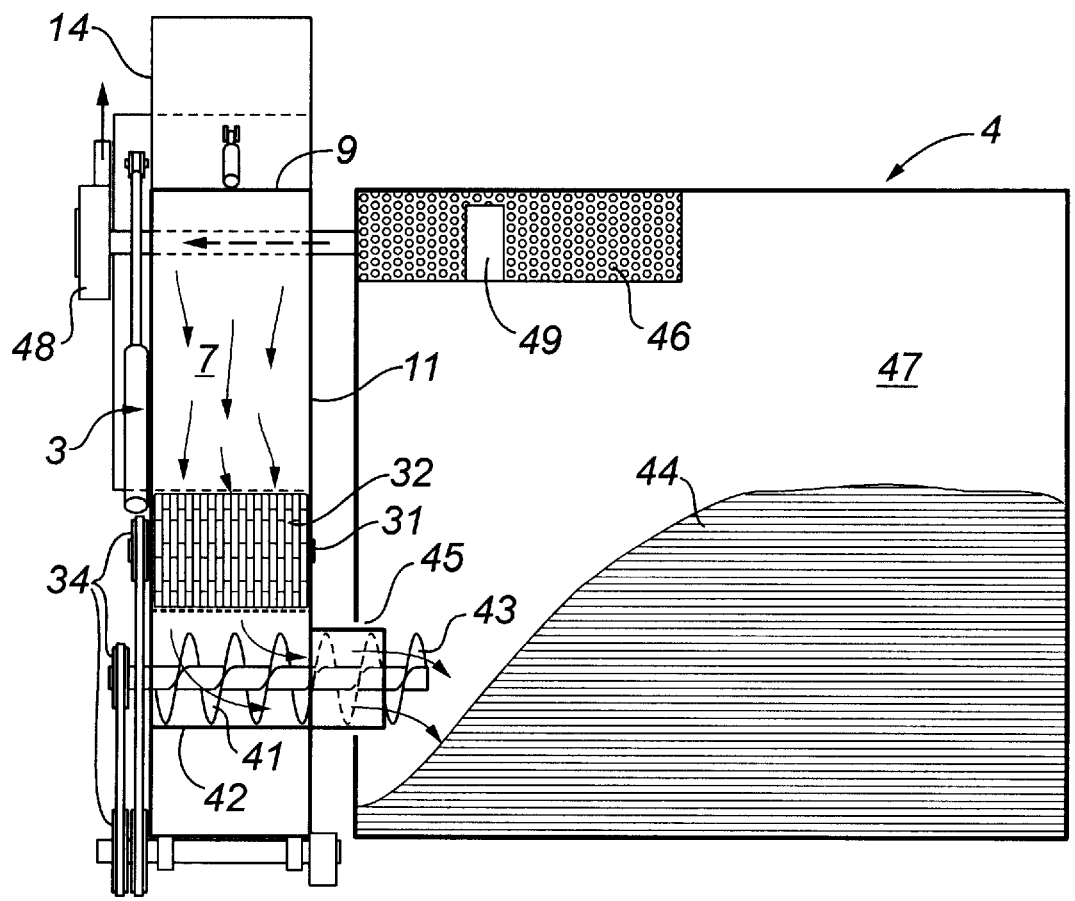
FIG. 4 is a side elevation, in section, showing the shredder and storage container linked in working relationship.
Figure 5:
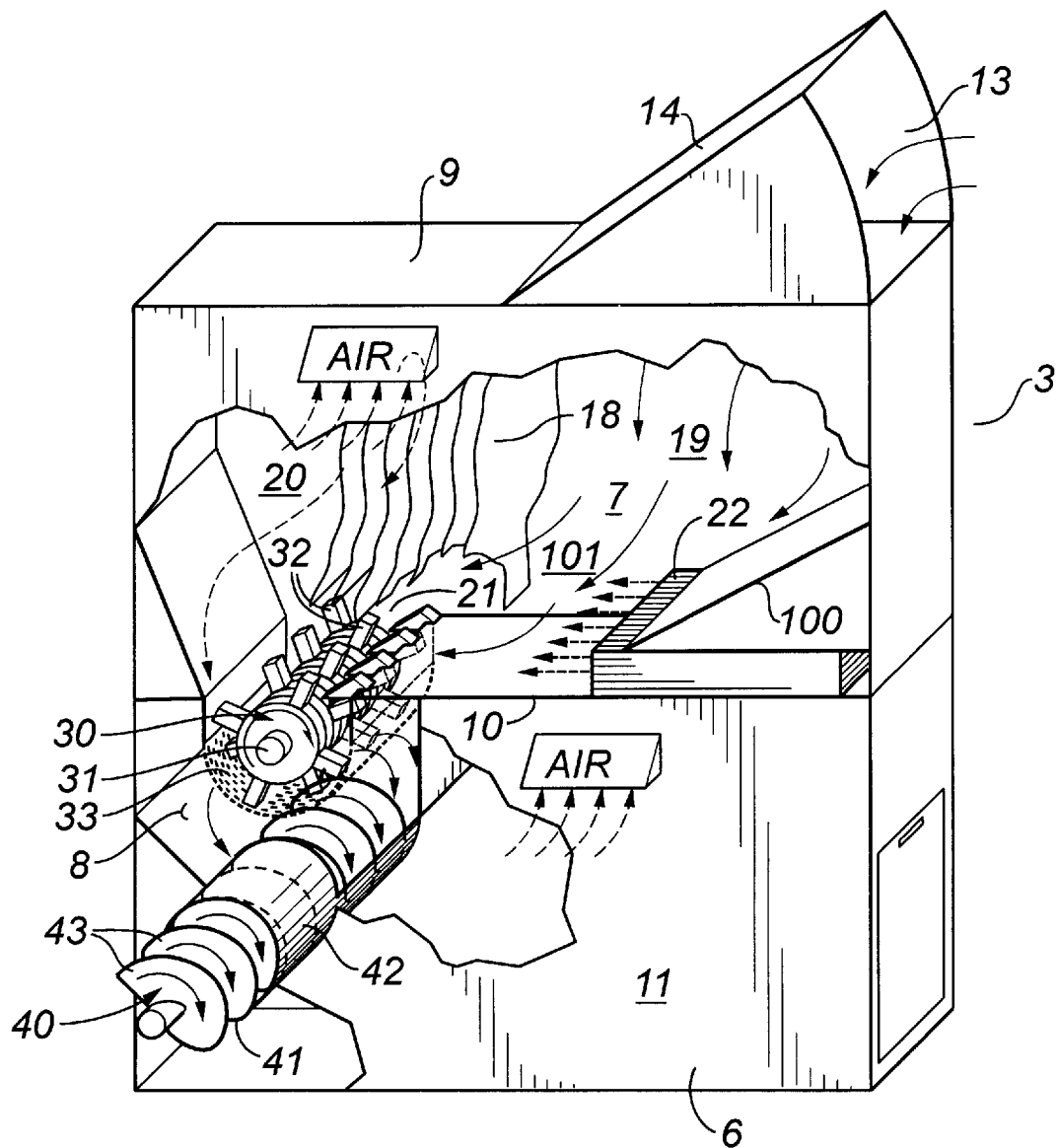
FIG. 5 is a perspective view, with part of the housing and some parts removed, showing the internals of the feed compartment of the shredder.

Having reference to FIG. 1, a paper-shredding assembly 1 is shown mounted on a truck 2. The assembly 1 comprises a shredder 3 which remains with the truck. The assembly 1 further comprises a storage container 4 which can operatively connect with the shredder 3, as shown in FIG. 1, or can be removed from the truck and be left standing on telescoping legs 5.

More particularly, the shredder 3 comprises a housing 6 forming an upper feed compartment 7 and a lower chamber 8.

The feed compartment 7 is generally rectangular and has top, bottom and side walls 9, 10, 11 and first and second ends. At its first end, the top wall 9 forms a paper feed opening 13 having a hinged lid 14. Lifting arms 15, pivotally attached to the housing 6, are provided to lift a receptacle 16 and tip it to empty contained paper into the paper feed opening 13.

A hydraulic cylinder 17, pivotally attached to the housing 6 and arms 15, is provided to actuate the arms.

Rubber belting 18 hangs partway down from the compartment top wall 9 and divides the compartment 7 into first and second sections 19, 20.

The feed compartment bottom wall 10 forms a hammer mill opening 21 adjacent its second end.

A sloped baffle 100 extends down from the first end side wall 11 and combines with the belting 18 to form a downwardly tapering feed passage 101.

A plunger 22 is located beneath the baffle 100 and on the bottom wall 10 at its first end. The plunger 22 extends transversely across the width of the feed compartment 7. A hydraulic cylinder 24 is connected at one end with the plunger 22 by a lug 25 extending through a slot (not shown) in the bottom wall 10. At its other end, the cylinder 24 is connected with a stationary lug 26 connected to the underside of the bottom wall 10. The cylinder 24 contracts to advance the plunger 22 along the bottom wall 10 toward the hammer mill opening 21 and expands to retract the plunger to the first end of the compartment 7. The cylinder 24 is actuated by the truck's hydraulic system (not shown).

It is contemplated that an auger could be substituted for the plunger 22. However the plunger 22 is preferred.

A hammer mill 30 is positioned in the lower chamber 8 immediately below the opening 21. The mill 30 comprises a shaft 31 carrying flails or hammers 32. It is contained within a semi-circular screen 33. The hammer mill is mounted to the side walls 11. It is driven by a pulley and belt system 34 connected with the power take-off (not shown) of the truck 2.

The hammer mill 30 is positioned so that its hammers 32 will protrude through the opening 21 up into the feed compartment 7 when rotating.

A wall 35 combines with the housing 6 to form a narrowing hopper 36 for guiding shredded paper produced by the mill down to the auger assembly 40. The auger assembly 40 comprises a screw auger 41 working within a transfer tube 42. It is mounted to the compartment side walls 11 and is below and aligned with the hammer mill 30. The transfer tube 42 is semi-circular along its length within the lower chamber 8 and then changes to a fully tubular form as it extends through the side wall 11. As shown, the auger assembly 40 protrudes out of the housing 6. The auger at this end is longer than the tube 42 so that the flights 43 will release the paper being transferred and act like a screw to compress paper in the storage chamber 47. The auger 41 is driven by the pulley and belt assembly 34. The auger 41 is coupled to the assembly 34 by a planetary gear (not shown) so that it can apply increasing torque at constant rotational speed, to maintain its feed rate while compressing the shredded paper 44.

The storage container 4 is a discrete closed box having an inlet 45 through which the auger assembly 40 extends. A filter 46 is mounted to the container 4 within the upper reaches of the storage chamber 47 and is connected with an external blower 48. The blower 48 exerts suction to pull air through the shredder 3 and storage chamber 47 to remove dust. The dust accumulates in the filter 46 and can be dislodged at the end of the shredding run by an air hammer 49, so that it drops into the loaded storage chamber 47.

As previously stated the storage container 4 has telescoping legs 5 which can be extended to the ground.

The truck used has an air ride suspension. Its deck can be lowered by letting air out of the suspension. In this way the truck can drive out from beneath the container 4 and leave it standing for recovery by a truck dedicated to moving containers to the paper recycling facility.

In operation, a loaded receptacle 6 from the office is wheeled to the mobile shredder assembly 1. The arms 15 are actuated to lift and tip the receptacle so that its contents are dumped into the feed compartment front section 19. The paper slides down the baffle 100 to the front of the plunger 22. The plunger biases it to the hammer mill opening 21. The hammers 32 engage and drive the paper into the impact fingers (not shown) to shred the paper. The belting 18 isolates paper thrown up by the hammers and keeps it in the compartment back section 20. Shredded paper exits the hammer mill screen 33 and drops through the hopper 36 into the open auger 41. The flights 43 of the auger advance the shredded paper into the storage chamber 47. The last few flights 50, located beyond the end of the transfer tube 42, function to compress the shredded paper as it fills the chamber 47. The blower 48 functions to draw produced dust through the shredder 3 and storage container 4 into the filter 46, wherein the dust collects. The air hammer 49 can be actuated at the completion of shredding, to dislodge the dust so that it drops into the loaded storage removal for removal.

Advantages:

The shredding assembly is characterized by the following advantageous features:

the shredder is compact and light in weight;

the tapering feed passage 101 and hopper 36 function to maintain even feed conditions for the plunger and auger;

the plunger is hydraulically driven and reciprocates continuously to rapidly feed the hammer mill and keep the bottom wall surface clean;

the auger also runs continuously to maintain even flow and is improved with respect to dust movement;

the removable storage container enables a single shredder to spend the day loading several containers and leave them standing for later pick up, for example by a night crew.

The foregoing description is directed to the best present mode of the invention. The scope of the invention is defined by the claims now following.

The Embodiments of the invention in which an exclusive property or privilege is claimed are defined as follows:

1. A paper-shredding assembly for use on a truck, comprising:

a shredder having an upper feed compartment and a lower chamber containing a rotary hammer mill and a discharge auger assembly;

a storage container forming a storage chamber and positionable adjacent the shredder, said container forming an auger inlet, communicating with the storage chamber, for enabling the auger assembly to extend into the chamber when the container is operatively connected with the shredder, the container being a discrete unit so that it may independently be removed from the truck;

the feed compartment being rectangular and having top, bottom and side walls and first and second ends, the top wall forming a feed opening through which paper may be fed for shredding, the bottom wall forming a hammer mill opening adjacent its second end;

the hammer mill being supported by the shredder in position beneath the hammer mill opening, said mill having hammers which protrude into the feed compartment when rotating;

a reciprocating plunger, positioned within the feed compartment and extending transversely thereof, said plunger being operative to move along the bottom wall from adjacent its first end toward the hammer mill opening for biasing paper, fed through the feed opening, directly into the rotating hammers;

an auger assembly, positioned beneath the hammer mill and supported by the shredder, said auger assembly projecting through the auger inlet into the storage chamber of the container; and means for actuating the hammer mill, auger assembly and plunger;

whereby the plunger will sweep the bottom of the feed compartment substantially clean, the auger assembly will transfer shredded paper from the shredder into the storage chamber and compress it, and the loaded container can be removed from the truck as a discrete unit.

2. The assembly as set forth in claim 1 comprising:

means, associated with the storage container, for suctioning air and dust from the shredder and container, said means comprising a filter for collecting the dust.

3. The improvement as set forth in claim 2 wherein:

the biasing means comprises a reciprocating plunger extending transversely of the compartment.

4. In a paper shredding assembly for use on a truck and comprising a feed compartment for receiving paper to be shredded, said compartment having a bottom wall, a rotary hammer mill positioned beneath a hammer mill inlet opening formed in the bottom wall of the compartment, means in the compartment for biasing paper to the opening so that the hammer mill may draw in and shred the paper, a storage chamber, and means for transferring shredded paper produced by the hammer mill into the storage chamber and compressing it therein, the improvement comprising;

the biasing means is operative to sweep along the bottom wall to bias paper to the hammer mill inlet opening;

the transfer means comprises an auger assembly positioned beneath the hammer mill and extending into the storage chamber; and separate shredder and storage container units are provided, the shredder forming the feed compartment and housing and supporting the hammer mill and auger assembly, the storage container forming the storage chamber and an auger inlet through which the auger assembly may extend into the storage chamber, so that the storage container may be independently removed from the truck when loaded.

5. The improvement as set forth in claim 4 comprising:

means, associated with the storage container, for suctioning air and dust from the shredder and container, said means comprising a filter for collecting the dust.

6. The improvement as set forth in claim 5 wherein:

the biasing means comprises a reciprocating plunger extending transversely of the compartment.

7. The improvement as set forth in claim 4 wherein:

the biasing means comprises a reciprocating plunger extending transversely of the compartment.

* * * * *